(12) United States Patent
Manasse et al.

(10) Patent No.: US 9,189,488 B2
(45) Date of Patent: Nov. 17, 2015

(54) DETERMINATION OF LANDMARKS

(75) Inventors: Mark S. Manasse, San Francisco, CA (US); Arnd Christian König, Kirkland, WA (US); Paul Adrian Oltean, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 500 days.

(21) Appl. No.: 13/081,497

(22) Filed: Apr. 7, 2011

(65) Prior Publication Data

US 2012/0259897 A1    Oct. 11, 2012

(51) Int. Cl.
G06F 17/30    (2006.01)
G06F 21/10    (2013.01)

(52) U.S. Cl.
CPC .......... *G06F 17/30156* (2013.01); *G06F 21/10* (2013.01)

(58) Field of Classification Search
CPC ...................................................... G06F 21/10
USPC ......................... 707/791, 802, 803, 809, 812, 707/999.101–102; 370/473, 412; 386/251
See application file for complete search history.

(56) References Cited

U.S. PATENT DOCUMENTS

| | | | |
|---|---|---|---|
| 7,504,969 B2 | 3/2009 | Patterson et al. | |
| 2008/0159331 A1* | 7/2008 | Mace et al. | 370/473 |
| 2009/0313248 A1 | 12/2009 | Balachandran et al. | |
| 2010/0011071 A1* | 1/2010 | Zheleva | 709/206 |
| 2010/0094817 A1* | 4/2010 | Ben-Shaul et al. | 707/697 |
| 2010/0246709 A1 | 9/2010 | Lillibridge et al. | |
| 2010/0250896 A1 | 9/2010 | Matze | |
| 2010/0280997 A1 | 11/2010 | Lillibridge et al. | |
| 2012/0020647 A1* | 1/2012 | Vogel | 386/251 |

OTHER PUBLICATIONS

Elbegbayan, Norzima, "Winnowing, a Document Fingerprinting Algorithm", Retrieved at <<http://reference.kfupm.edu.sa/content/w/i/winnowing_a_document_fingerprinting_alg_83507.pdf>>, 2005, pp. 8.

Seo, et al., "Local Text Reuse Detection", Retrieved at <<http://goanna.cs.rmit.edu.au/~e76763/tiger_ref/sc08-sigir.pdf>>, Jul. 20-24, 2008, pp. 8.

Zhang, et al., "Efficient Search in Large Textual Collections with Redundancy", Retrieved at <<http://cis.poly.edu/suel/papers/block.pdf>>, May 8-12, 2007, pp. 10.

(Continued)

*Primary Examiner* — Syling Yen
(74) *Attorney, Agent, or Firm* — Sandy Swain; Steve Wight; Micky Minhas

(57) ABSTRACT

Hash values corresponding to a file are processed in windows to determine a minimum hash value for each window. Each window may begin at a minimum hash value determined for a previous window and end after a fixed number of hash values. If a hash value is less than a threshold hash value, it is added to a buffer that is used to store the hash values in sorted order for a current window. If a hash value is greater than the threshold, it is added to another buffer whose hash values are not stored in sorted order. At the end of the current window, the minimum hash value in the first buffer is selected as the landmark for the window. If the first buffer is empty, then the hash values in the other buffer are sorted and the minimum hash value is selected as the landmark for the window.

16 Claims, 6 Drawing Sheets

(56) References Cited

OTHER PUBLICATIONS

Bjorner, et al., "Content-Dependent Chunking for Differential Compression, The Local Maximum Approach", Retrieved at <<http://research.microsoft.com/en-us/um/people/gurevich/Opera/190.pdf>>, Retrieved Date: Dec. 20, 2010, pp. 1-59.

Schleimer, et al., "Winnowing Local Algorithms for Document Fingerprinting", Retrieved at <<http://theory.stanford.edu/~aiken/publications/papers/sigmod03.pdf>>, Jun. 9-12, 2003, pp. 10.

"The minimum on a sliding window algorithm", Retrieved at <<http://home.tiac.net/~cri/2001/slidingmin.html>>, 2001, pp. 4.

\* cited by examiner

200

DETERMINATION OF LANDMARKS

BACKGROUND

Data deduplication, the identification and reduction of duplicate or near duplicate data, is a goal in computer science. For example, data deduplication techniques can be used to reduce duplicate documents in a search engine index, help teachers identify plagiarized portions of a student paper, and improve data compression and transmission. By removing duplicate data and/or increasing the compression of existing data, overall hardware, networking, and energy costs may be reduced for a variety of organizations.

One method for data deduplication is the selection of landmarks in data files. The landmarks associated with a file are typically hash values generated from portions of the files. The landmarks may then be used to bound chunks in the data files, for example. One such technique that determines landmarks is known as winnowing. Winnowing, as introduced by Schleimer, Wilkerson, and Aiken, is a powerful technique for selecting landmarks. However, existing winnowing methods may not be optimal in some situations.

SUMMARY

Hash values are generated for each portion of a received file. The hash values are processed in windows to determine a summary hash value for each window. The summary hash may be selected from a group of hash values using any one of a variety of pre-defined ordering methods such as a minimum or maximum ordering method. In implementations where the summary hash is the minimum hash, each window may begin with the minimum hash value determined for a previous window and end after a fixed number of hash values. If a hash value is less than a threshold hash value, it is added to a buffer (e.g., a ring buffer) that is used to store the hash values in sorted order for a current window that are less than the threshold. If a processed hash value is greater than the threshold, it is added to another buffer whose hash values are not stored in sorted order. The threshold is selected so that the minimum hash for the window is likely to be less than the minimum hash according to the ordering method and therefore stored in the ring buffer. After all of the hash values in a current window have been processed, the minimum hash value in the ring buffer is selected as the landmark for the window. If the ring buffer is empty, then the hash values in the other buffer are sorted and the minimum hash value is selected as the landmark for the window.

In an implementation, a data value is received at a computing device. The data value is associated with a position in a sequence of data values. The received data value is added to a first data structure by the computing device. One or more data values from the first data structure that are greater than the received data value are determined. The one or more determined data values are removed from the first data structure. Based on the position associated with the received data value, a determination is made as to whether the received data value is a last data value for a current window. If the received data value is the last data value, a minimum data value from the first data structure is associated with the window by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
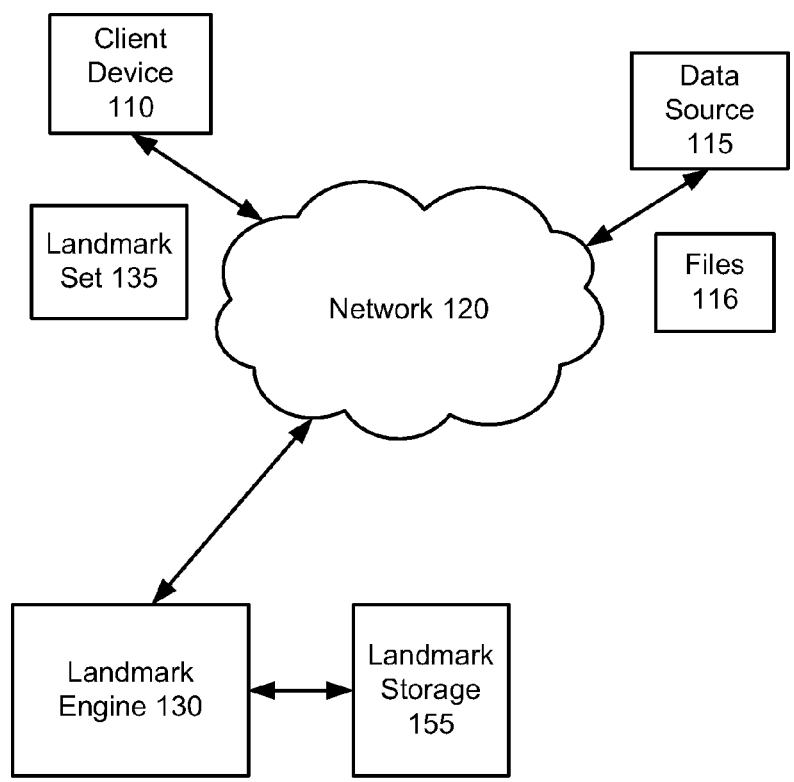
FIG. 1 is an illustration of an example environment using a landmark engine.

FIG. 1 is an illustration of an example environment 100 using a landmark engine 130. The environment 100 may include a client device 110 and the landmark engine 130 in communication with one another through a network 120. The network 120 may be a variety of network types including the public switched telephone network (PSTN), a cellular telephone network, and a packet switched network (e.g., the Internet). Although shown as comprised within separate devices over the network 120, depending on the implementation, the client device 110 and the landmark engine 130 may be comprised within a single computing device, or one or more devices that do not communicate over the network 120.

In some implementations, the client device 110 may include a desktop personal computer, workstation, laptop, PDA (personal digital assistant), smart phone, cell phone, or any WAP (wireless application protocol) enabled device or any other computing device capable of interfacing directly or indirectly with the network 120. A client device 110 may be implemented using a general purpose computing device such as the computing device 600 described with respect to FIG. 6, for example. While only one client device 110 is shown, it is for illustrative purposes only; multiple client devices 110 may be supported.

The environment 100 may further include a data source 115. The data source 115 may store, generate, or provide one or more files 116 to the landmark engine 130 and/or the client device 110. The files 116 may include a variety of files and any other entities that may be used to store a stream of data. In some implementations, the files 116 may be streamed to the landmark engine 130 and/or the client device 110. In such a scenario, the landmark engine 130 may receive a file in portions and may begin processing or using the file before all of the portions are received. Note that the environment 100 is not limited to files 116 but may apply to any other entity containing data such as messages, documents, byte streams, etc.

The landmark engine 130 may generate one or more landmarks for a received file. The generated landmarks may be associated with the file and stored in a landmark storage 155. The generated landmarks associated with a file may be provided to the client device 110 as a landmark set 135 and may be used by the client device 110 for a variety of data deduplication related tasks. For example, the landmark set 135 associated with a file may be used to select chunks to use for compressing the file, or group of related files, to determine whether the file is a duplicate or near-duplicate of another file, or to determine if the file has any content that may have been plagiarized from another file. Other data deduplication methods or techniques may be supported.

Figure 2:
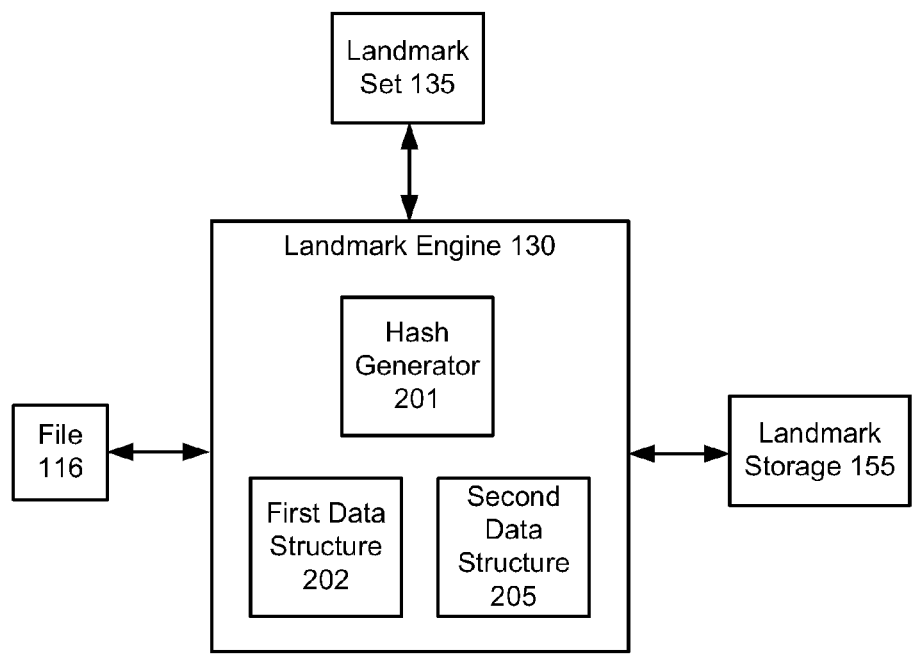
FIG. 2 is an illustration of an example landmark engine.

FIG. 2 is an illustration of an example landmark engine 130. As illustrated, the landmark engine 130 includes a hash generator 201, a first data structure 202, and a second data structure 205. More or fewer components may be supported by the landmark engine 130. The landmark engine 130 may be implemented using a general purpose computing device such as the computing device 600 described with respect to FIG. 6, for example.

The hash generator 201 may receive portions of a file (e.g., one of the files 116) through an input stream and may generate data values based on the received portions. In some implementations, the generated data values may be random hash values and may be generated by the hash generator 201 using portions of the file. For example, the hash generator 201 may generate a hash of each 32-bit sized portion of the file. However, other size portions may be used. The size of the portions used by the hash generator 210 may be set by a user or administrator. The hash generator 201 may use a hash function such as a Rabin hash function. Other types of hash functions may be used. Each hash value may have an associated position that reflects the position of the portion of the file that the hash value was generated from.

The landmark engine 130 may receive the generated hash values and may examine the received hash values to determine a landmark for what is referred to as a window. A window may include a sequence of hash values generated by the hash generator 201. Each window may include a range of hash value positions.

Figure 3:
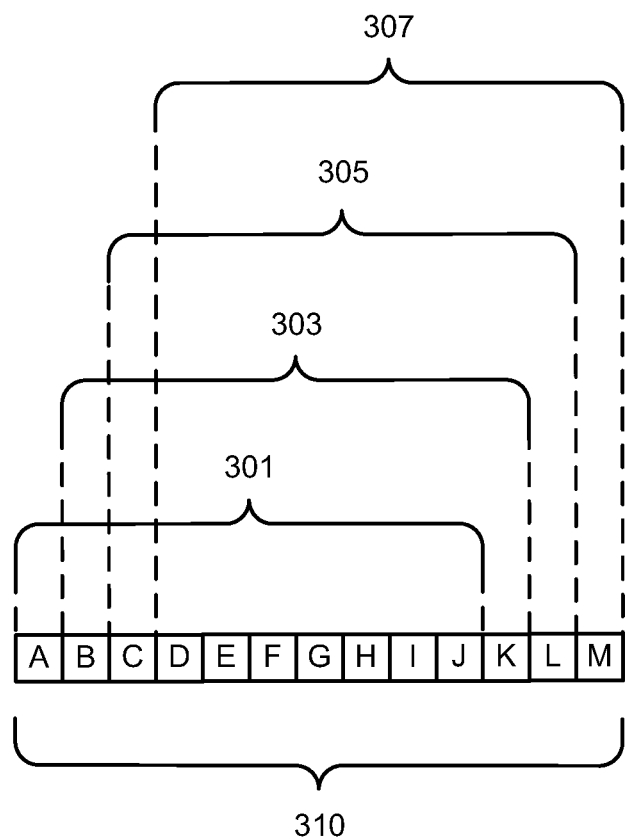
FIG. 3 is an illustration of example windows for a data file.

FIG. 3 is an illustration of four example windows for a sequence of hash values 310. The sequence of hash values 310 shown includes 13 hash values labeled A-M. The hash values 310 may represent a sequence of hash values generated from a file by the hash generator 201.

The illustration includes four windows 301, 303, 305, and 307. Each of the windows 301-307 corresponds to a subset of the hash values of the sequence of hash values 310. As shown, the hash values corresponding to each of the windows 301, 303, 305, and 307 include overlapping hash values. The window 301 includes the hash values A-J, the window 303 includes the hash values B-K, the window 305 includes the hash values C-L, and the window 307 includes the hash values D-M. Note that the number of hash values in the sequence of hash values 310, the number of windows 301-307, and the number of hash values corresponding to each of the windows 301-307 are for illustrative purposes only.

The landmark engine 130 may determine a landmark for each window based on the hash values corresponding to the window. In some implementations, the landmark for a window may be the minimum hash value corresponding to the window according to a predefined ordering method. The ordering method may be a variety of ordering methods such as a minimum or a maximum ordering method. Other types of landmarks and ordering methods may also be supported.

The landmark engine 130 may process the hash values associated with each window one by one starting with the left most hash value (e.g., the hash value with the lowest position in the sequence of hash values). Thus, referring to FIG. 3, the landmark engine 130 may process the hash values starting with the hash value A and ending with the hash value M.

The landmark engine 130 may process the hash values and place the processed hash values in the first data structure 202. Each processed hash value may be placed in the first data structure 202 along with an indicator of the position of the hash value. In some implementations, the hash values may be kept in sorted order in the first data structure 202. Thus, the minimum hash value observed so far for a window can be determined from the first data structure 202. The first data structure 202 may be implemented using a variety of a data structures such as a ring buffer, for example. Other data structures may also be used.

In some implementations, when the landmark engine 130 places a hash value in the first data structure 202, the hash values that have a value that is greater than the placed hash value according to the predefined ordering method may be removed from the first data structure 202. As described above, the landmark is the minimum hash value for a window; therefore, any hash value that has a greater value than the most recently placed hash value cannot be the minimum hash value.

In some implementations, duplicate hash values may be added to the first data structure 202. Thus, a hash value may appear in the first data structure 202 multiple times for different positions. In other implementation, duplicate hash values may be removed from the first data structure 202. The hash value having the greatest or right most position with respect to the file 116 may be retained in the first data structure 202 in the case of a tie.

The landmark engine 130 may further remove values from the first data structure 202 whose associated position is outside of the current window. As the landmark engine 130 processes the hash values in the sequence of values, some of the hash values added to the first data structure 202 may no longer be associated with a position corresponding to the position range of the current window and therefore could not be the landmark for the current window. Thus, those hash values may be removed from the first data structure 202.

For example, the current window may be the window 307 illustrated in FIG. 3. If any of the hash values labeled A, B, or C are in the first data structure 202 they may be removed by the landmark engine 130 because they are outside of the window 307 and therefore cannot be the minimum hash value for the window 307.

The landmark engine 130 may determine that a hash value is the last hash value in a window, and after processing the last hash value, determine the minimum hash value as the landmark for the window according to the predefined ordering method. In some implementations, the landmark engine 130 may determine the minimum hash value for the window by determining the minimum hash value from the first data structure 202. The determined minimum hash value may be associated with the file (i.e., one of the files 116 that was being processed) and/or the current window and may be added to the landmark storage 155.

For example, the landmark engine 130 may process the hash value J illustrated in FIG. 3. The landmark engine 130 may determine that the hash value J is the last hash value in the window 301. Accordingly, the landmark engine 130 may then determine the minimum hash value from the first data structure 202 and may determine the minimum hash value as the landmark for the window.

The landmark engine 130 may further include the second data structure 205. The landmark engine 130 may use the second data structure 205 to store one or more hash values that are greater than a threshold hash value according to the predefined ordering method. The threshold hash value may be selected such that the minimum hash value for a window is likely to be below the threshold hash value. Hash values that are greater than the threshold value may be added to the second data structure 205 by the landmark engine 130, rather than the first data structure 202. In some implementations, the second data structure 205 may not be kept in sorted order, and therefore it may be less computationally expensive for the landmark engine 130 to add a hash value to the second data structure 205 instead of to the first data structure 202. The threshold hash value may be selected by a user or administrator prior to determining the landmark.

As described above, the landmark engine 130 may select the minimum hash value from the first data structure 202 as the landmark for a window according to a predefined ordering method. However, where a threshold hash value is used to select hash values for the second data structure 205, in some situations no hash values may be in the first data structure 202. For example, hash values may have been removed from the first data structure 202 for falling outside of the current window and/or all hash values in the current window may have been above the threshold hash value and were placed in the second data structure 205. In such scenarios, the landmark engine 130 may process the hash values in the second data structure 205 to determine the minimum hash value for the window. However, because the hash values are not kept in the second data structure 205 in sorted order, the landmark engine 130 may first sort the hash values to determine the minimum hash value. In addition, because determining the minimum hash value from the second data structure 205 may be computationally expensive, the threshold hash value may be raised by the landmark engine 130 so that future hash values of the next window are more likely to fall below the threshold.

In some implementations, the second data structure 205 may be cleared or emptied by the landmark engine 130 when a hash value is added to the first data structure 202 for a current window. Because a hash value is added to the first data structure 202 for the current window, there is no scenario where the first data structure 202 may be empty and the landmark engine 130 would select the minimum hash value from the second data structure 205 with respect to the current window. Therefore, the hash values placed in the second data structure 205 may be discarded without fear of missing the minimum hash value for the current window.

In some implementations, rather than place hash values that are above the threshold hash values in the second data structure 205, the landmark engine 130 may discard hash values that are above the threshold hash value. If the first data structure is empty is at the end of a current window indicating that the threshold hash value was too high, the landmark engine 130 may reduce the threshold hash value and reprocess each hash value from the current window with respect to the reduced threshold hash value to determine the minimum hash value.

The landmark engine 130 may store the landmarks determined for each window of a file in the landmark storage 155 as a landmark set 135, and may provide the landmark set 135 to a client device 110. The landmark set 135 associated with the file may be used by the client device 110 to perform a variety of data deduplication related tasks, such as determining duplicates or near-duplicates of the file or for compressing the file.

For example, in some implementations, the landmark set 135 determined for a file may be used to divide the file into a set of variable sized segments. One or more fingerprinting functions may be used to generate identifiers from the variable sized segments. These identifiers can be compared to identify duplicate portions within a single file for purposes of compression, or to identify duplicate portions across a group of files for purposes of data deduplication.

Figure 4:
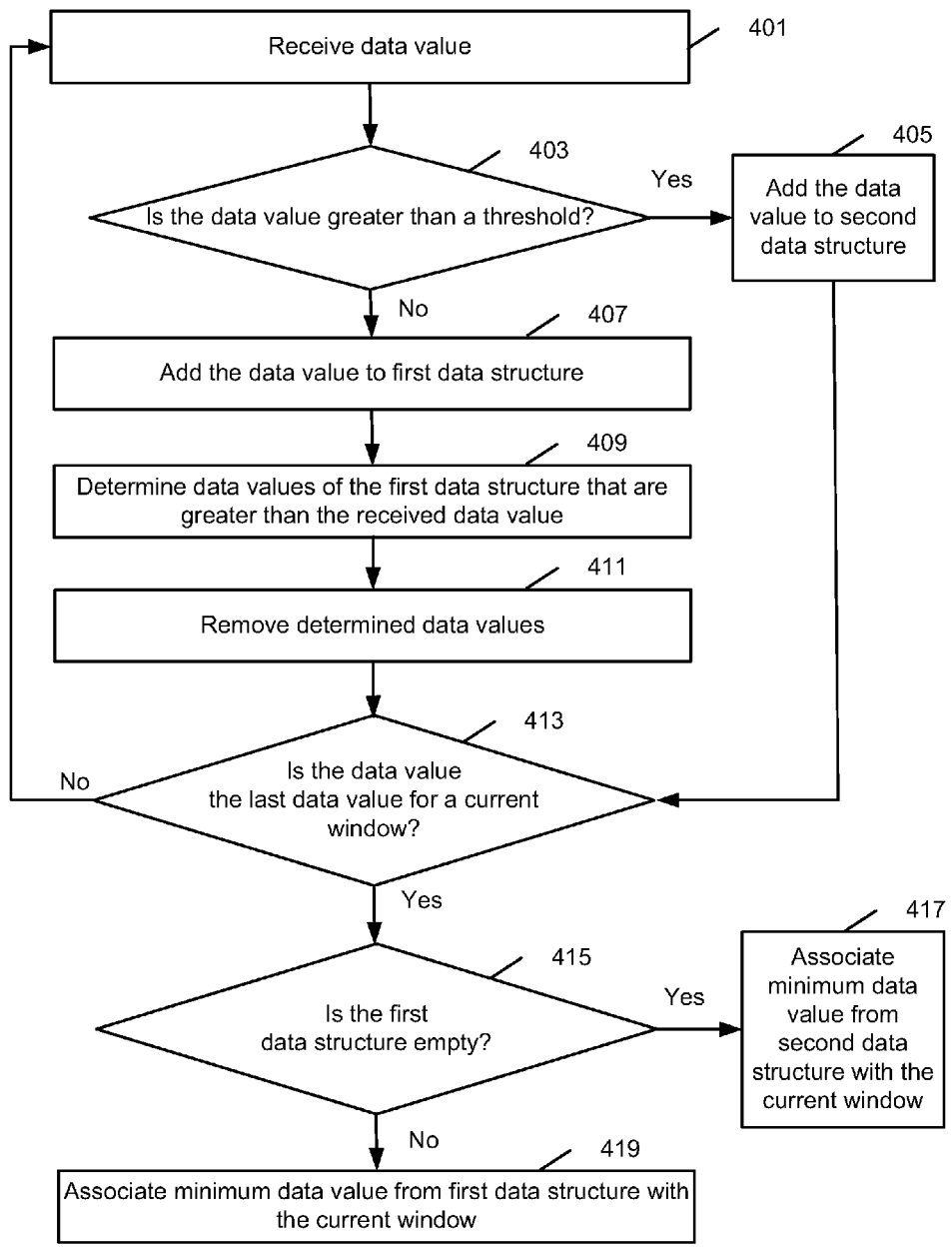
FIG. 4 is an operational flow of an implementation of a method for determining a landmark for a window.

FIG. 4 is an operational flow of an implementation of a method 400 for determining a landmark for a window. The method 400 may be implemented by the landmark engine 130, for example.

A data value is received at 401. The data value may be received by the landmark engine 130 and/or generated by the hash generator 201. The data value may be a hash value and may have been generated from a portion of a file or data stream (e.g., one of the files 116) received from a data source 115, for example. The data value may have a corresponding position in the file.

A determination is made as to whether the received data value is greater than a threshold at 403. The determination may be made by the landmark engine 130 according to a predefined ordering method. Because the data value selected as the landmark for a window is the minimum data value for the window, a threshold value may be selected that is likely to be greater than the determined minimum data value. Data values that are below this threshold may be added to a first data structure 202, and data values that are above this value may be added to a second data structure 205. The first data structure 202 may be maintained in sorted order, so by only adding data values to the first data structure 202 that are likely to be the minimum data value the additional processing used to sort the data values in the first data structure 202 may be reduced. If the received data value is greater than the threshold data value then the data value is added to the second data structure 205 at 405. Otherwise, the data value is added to the first data structure 202 at 407.

At 405, the received data value is added to the second data structure. The received data value may be added to the second data structure 205 by the landmark engine 130. The method 400 may then continue at 413.

At 407, the received data value is added to the first data structure. The received data value may be added to the first data structure 202 by the landmark engine 130. The first data structure 202 may then be resorted by the landmark engine 130. Data values in the first data structure that are greater than the added data value are determined at 409. The data values may be determined by the landmark engine 130. The determined data values are removed from the first data structure at 411, e.g., by the landmark engine 130. Because the determined values are greater than the newly added data value, they cannot be the minimum data value for the window. Thus, space and computational resources associated with sorting the first data structure 202 may be saved by removing the determined values.

At 413, a determination is made as to whether the received data value is the last data value for a current window. The determination may be made by the landmark engine 130 based on the position associated with the data value and the range of positions covered by the current window. If the received data value is the last data value, then the method 400 may continue at 415. Otherwise, the method 400 may return to 401 where a new data value in the current window may be received.

At 415, a determination is made as to whether the first data structure is empty. The determination may be made by the landmark engine 130. If the first data structure 202 is empty, then the method 400 may continue at 417. Otherwise, the method 400 may continue at 419.

At 417, a minimum value from the second data structure is associated with the current window, e.g., by the landmark engine 130. Because the second data structure 205 is not sorted, the landmark engine 130 sorts the second data structure 205 to determine the minimum data value in the second data structure 205. The minimum data value may then be associated with the current window as a landmark for the window. The landmark may further be associated with the file and stored in the landmark storage 155. In addition, because the first data structure 202 was empty, the landmark engine 130 may increase the threshold for the next window.

At 419, a minimum value from the first data structure is associated with the current window, e.g., by the landmark engine 130. Because the first data structure 202 is sorted, the landmark engine 130 may associate the minimum value with the current window without additional processing or sorting of the values in the first data structure 202. The minimum data value may be associated with the current window as a landmark for the window. The landmark may further be associated with the file 116 and stored in the landmark storage 155.

Figure 5:
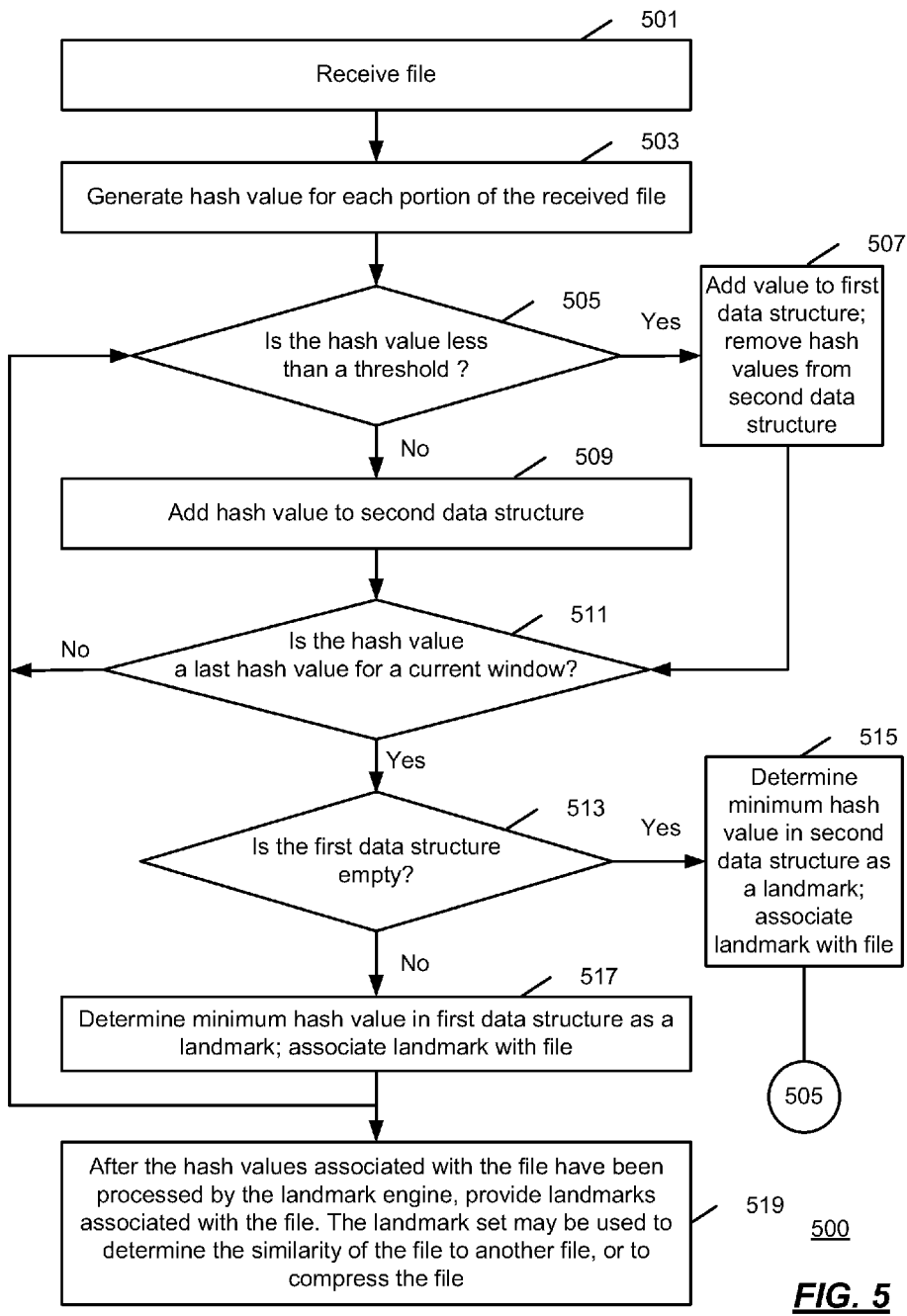
FIG. 5 is an operational flow of an implementation of a method for determining landmarks for a received file and for providing the determined landmarks.

FIG. 5 is an operational flow of an implementation of a method 500 for determining a plurality of landmarks for a received file and for providing the determined plurality of landmarks. The method 500 may be implemented by the landmark engine 130, for example.

A file is received at 501. The file 116 may be received by the landmark engine 130 from a data source 115. The file 116 may include a plurality of portions. The file 116 may comprise a data stream or any entity that stores data. A hash value is generated for each portion of the file at 503. The hash values may be generated by the hash generator 201 of the landmark engine 130. Each hash value may have an associated position with respect to the file 116. Any method for generating a hash value may be used.

A determination is made as to whether a hash value is greater than a threshold at 505. The determination may be made by landmark engine 130 according to a predefined ordering method. The determination may be made for each hash value in an order defined by the positions associated with each hash value. If the hash value is less than the threshold hash value, then the method 500 may continue at 507. Otherwise, the method 500 may continue at 509.

At 507, the hash value is added to a first data structure (e.g., first data structure 202) by the landmark engine 130, for example. In some implementations, the first data structure is a ring buffer and is maintained in a sorted order. The landmark engine 130 may further remove any hash values previously added to a second data structure and may remove any hash values from the first data structure that are greater than the added hash value according to the predefined ordering method. The method 500 may continue at 511.

At 509, the hash value is added to the second data structure 205, e.g., by the landmark engine 130. The second data structure 205 may be for values that are above the threshold hash value according to the predefined ordering method, and are therefore unlikely to be the minimum hash value for a current window. Unlike the first data structure 202, the second data structure 205 may not be kept in sorted order.

At 511, a determination is made as to whether the hash value is the last hash value for a current window. The determination may be made by the landmark engine 130 based on the position associated with the hash value. If the hash value is not a last hash value for the current window, the method 500 may return to 509 to process the next generated hash value. Otherwise, the method 500 may continue at 513.

At 513, a determination is made as to whether the first data structure is empty. The determination may be made by the landmark engine 130. If the first data structure 202 is empty, then no hash values in the current window were below the threshold value and the method 500 may continue at 515. Otherwise, the minimum hash value is in the first data structure 202 and the method 500 may continue at 517.

At 515, the minimum hash value is determined from the second data structure and associated with the file as a landmark, e.g., by the landmark engine 130. Because the second data structure 205 is not kept in sorted order, the landmark engine 130 may determine the minimum hash value by processing each value hash value in the second data structure 205. Any method for determining a minimum value from a set of values may be used. The minimum hash value may be associated with the current window and/or the file as a landmark and stored in the landmark storage 155. The method 500 may then continue to process hash values for a next window in the file at 505.

At 517, the minimum hash value is determined from the first data structure and associated with the file as a landmark, e.g., by the landmark engine 130. Because the first data structure 202 is kept in sorted order, the landmark engine 130 may quickly determine the minimum hash value from the first data structure 202 without additional sorting of the hash values. The minimum hash value may be associated with the current window and/or the file as a landmark and stored in the landmark storage 155. The method 500 may then continue to process hash values for a next window in the file at 505.

Landmarks associated with the file are provided at 519. The landmarks may be comprised within (or form) the landmark set 135 and may be provided by the landmark engine 130 to the client device 110. The landmark set 135 may be provided from the landmark storage 155 after all of the hash values associated with the file have been processed by the landmark engine 130. The landmark set 135 may then be used to determine the similarity of the file to another file, or to compress the file, for example.

Figure 6:
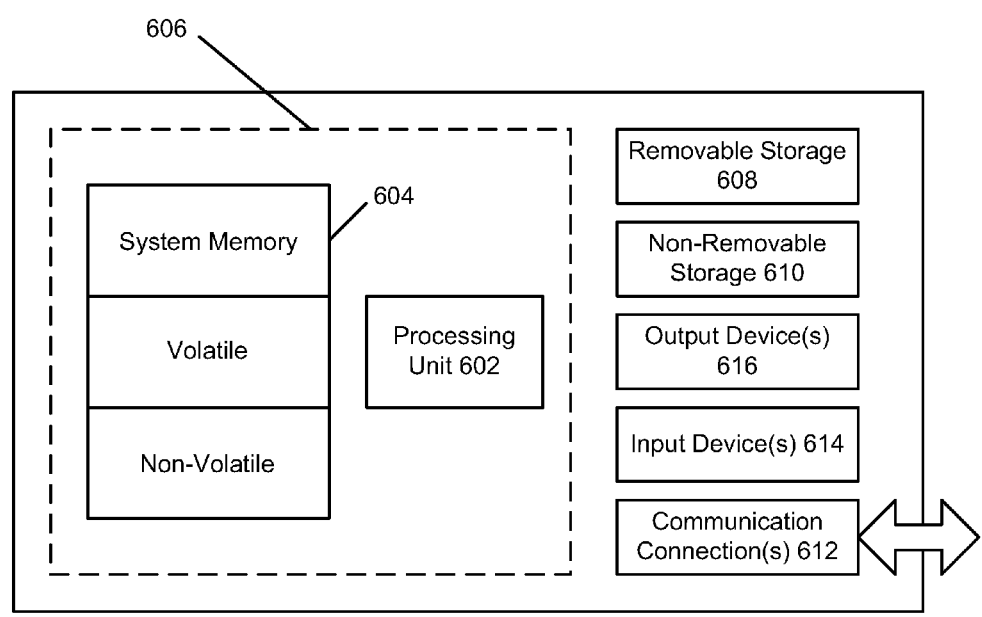
FIG. 6 shows an exemplary computing environment in which example embodiments and aspects may be implemented.

FIG. 6 shows an exemplary computing environment in which example embodiments and aspects may be implemented. An exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. The communication connection(s) 612 may include one or more networks implemented using a variety of well known networking techniques. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a data value at a computing device, wherein the data value is associated with a position in a sequence of data values;
   determining whether the received data value is greater than a threshold value according to a predefined ordering method by the computing device;
   when it is determined that the received data value is not greater than the threshold value:
      adding the received data value to a first data structure by the computing device;
      determining one or more data values from the first data structure that are duplicate data values of the received data value by the computing device;
      removing the one or more determined duplicate data values from the first data structure by the computing device;
      determining one or more data values from the first data structure that are greater than the received data value according to the predefined ordering method by the computing device;
      removing the one or more determined data values that are greater than the received data value from the first data structure by the computing device;
      determining, based on the position associated with the received data value, if the received data value is a last data value for a current window by the computing device, wherein the current window is associated with a range of positions in the sequence of data values; and
      if it is determined that the received data value is the last data value for the current window, associating a minimum data value from the first data structure with the window by the computing device; and
   when it is determined that the received data value is greater than the threshold value, adding the received data value to a second data structure by the computing device, wherein data values in the first data structure are kept sorted according to the predefined ordering method, and data values in the second data structure are not kept sorted according to the predefined ordering method.

2. The method of claim 1, wherein the data value is a hash value.

3. The method of claim 1, wherein the sequence of data values is associated with a file or a data stream, and the minimum data value is associated with the file or the data stream.

4. The method of claim 1, wherein the first data structure comprises a ring buffer.

5. The method of claim 1, further comprising:
   determining one or more data values from the first data structure that have an associated position that is outside of the range of positions associated with the window; and
   removing the determined one or more data values that have an associated position that is outside of the range of positions from the first data structure.

6. The method of claim 1 further comprising:
   determining that the first data structure is empty;
   in response to determining that the first data structure is empty, sorting the data values in the second data structure according to the predefined ordering method;
   determining a minimum data value from the second data structure; and
   associating the determined minimum data value from the second data structure with the window.

7. A method comprising:
   receiving a file comprising a plurality of portions at a computing device;
   generating a hash value for each of the portions by the computing device, wherein each hash value is associated with a position in the received file;
   for each hash value:
      if the hash value is less than a threshold hash value according to a predefined ordering method:
         adding the hash value to a first data structure;
         determining one or more hash values from the first data structure that are duplicate hash values of the added hash data value;
         removing, the one or more determined duplicate hash values from the first data structure; and
         removing one or more hash values from the first data structure that are greater than the hash value according to the predefined ordering method;
      if the hash value is greater than the threshold value according to the predefined ordering method:
         adding the hash value to a second data structure, wherein hash values in the first data structure are kept sorted according to the predefined ordering method, and hash values in the second data structure are not kept sorted according to the predefined ordering method;

if the hash value is a last hash value for a current window:
if the first data structure is empty:
sorting the hash values in the second data structure according to the predefined ordering method when the first data structure is empty; and
determining a minimum hash value from the second data structure according to the predefined ordering method as a landmark;
if the first data structure is not empty, determining a minimum hash value from the first data structure according to the predefined ordering method as the landmark; and
associating the landmark with the file; and
providing one or more landmarks associated with the file by the computing device.

8. The method of claim 7, wherein the first data structure comprises a ring buffer.

9. The method of claim 7, wherein the file comprises an entity that stores data.

10. The method of claim 7, further comprising compressing the received file using the one or more landmarks associated with the file.

11. The method of claim 7, wherein adding the hash value to a first data structure further comprises clearing the second data structure.

12. A system comprising:
at least one computing device; and
a landmark engine, implemented by the at least one computing device, adapted to:
determine whether a generated hash value is greater than a threshold value according to a predefined ordering method;
when it is determined that the generated hash value is not greater than the threshold value:
add the generated hash value to a first data structure, wherein the generated hash value is associated with a position in a sequence of hash values;
determine one or more hash values from the first data structure that are duplicate hash values of the generated hash data value;
remove, the one or more determined duplicate hash values from the first data structure;
determine, based on the position associated with the generated hash value, if the generated hash value is a last hash value for a current window, wherein the current window is associated with a range of positions in the sequence of hash values; and
if it is determined that the generated hash value is the last hash value for the current window, associate a minimum hash value from the first data structure according to a predefined ordering method with the window; and
when it is determined that the generated hash value is greater than the threshold value, add the generated hash value to a second data structure, wherein hash values in the first data structure are kept sorted according to the predefined ordering method, and hash values in the second data structure are not kept sorted according to the predefined ordering method.

13. The system of claim 12, wherein the landmark engine is further adapted to receive a file or a data stream, and generate the sequence of hash values from the received file or data stream.

14. The system of claim 13, wherein the landmark engine is further adapted to associate the minimum hash value with the received file or data stream as a landmark.

15. The system of claim 12, wherein the landmark engine is further adapted to:
determine one or more hash values from the first data structure that are greater than the generated hash value according to the predefined ordering method; and
remove the one or more determined hash values that are greater than the generated hash value from the first data structure.

16. The system of claim 12, wherein the landmark engine is further adapted to:
determine one or more hash values from the first data structure that have an associated position that is outside of the range of positions associated with the current window; and
remove the determined one or more hash values that have an associated position that is outside of the range of positions from the first data structure.

* * * * *